March 23, 1926.

J. A. LE CAIN 1,577,914

STEAM ENGINE VALVE GEAR

Filed Nov. 8, 1921

Inventor
John A. Le Cain
By his Attorneys
Philip Sawyer & Kennedy

March 23, 1926.

J. A. LE CAIN 1,577,914

STEAM ENGINE VALVE GEAR

Filed Nov. 8, 1921    3 Sheets-Sheet 2

John A. Le Cain, Inventor

By his Attorneys

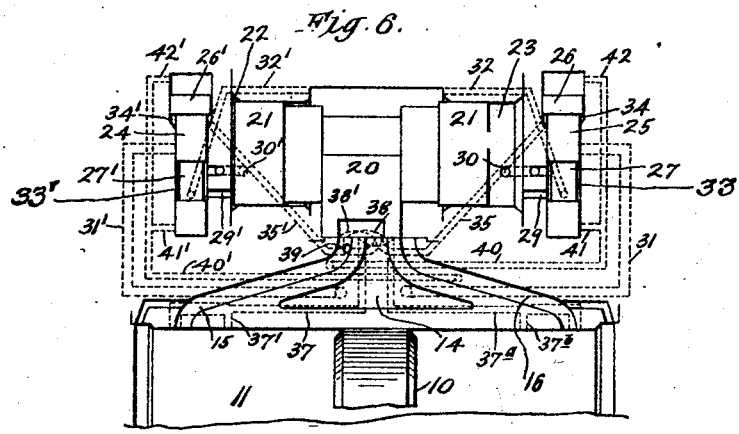
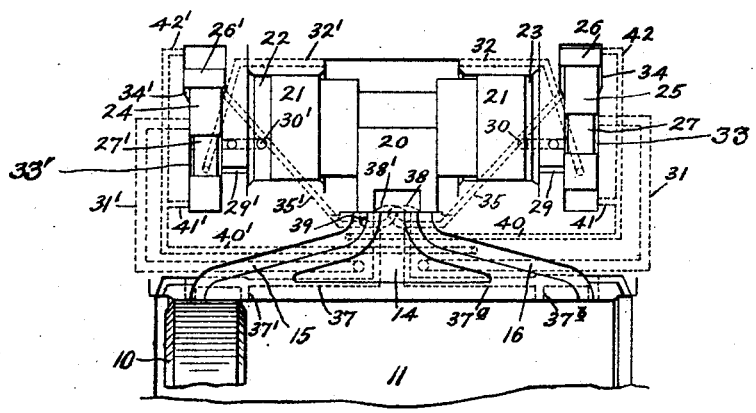

Patented Mar. 23, 1926.

1,577,914

UNITED STATES PATENT OFFICE.

JOHN A. LE CAIN, OF MALDEN, MASSACHUSETTS.

STEAM-ENGINE VALVE GEAR.

Application filed November 8, 1921. Serial No. 513,754.

*To all whom it may concern:*

Be it known that I, JOHN A. LE CAIN, a citizen of the United States, residing at Malden, county of Middlesex, and State of Massachusetts, have invented certain new and useful Improvements in Steam-Engine Valve Gears, fully described and represented in the following specification and the accompanying drawings forming a part of the same.

This invention relates to valve gear for fluid pressure engines, and more particularly to internal valve gear for steam pumping engines in which a pressure actuated main valve governing the distribution of steam to opposite sides of the working piston is controlled by a pressure actuated auxiliary valve or valves. In constructions of this type difficulty arises in starting when the main valve has accidentally stopped in center position, thereby preventing the passage of steam to one end or the other of the main cylinder.

The especial object of this invention is to provide an improved construction of this type so arranged that the main valve will be moved from its center position automatically upon turning on the steam.

For a full understanding of the invention, a detailed description of a construction embodying the same in its preferred form will now be given in connection with the accompanying drawings, forming a part of this specification, and the features forming the invention then particularly pointed out in the claims.

In the drawings,—

Fig. 6 is a diagrammatical view showing the cylinders arranged axially in the same plane rather than in planes at right angles to each other as actually constructed; and, Fig. 7 is a diagrammatical view similar to Fig. 6 showing the main valve and one of the auxiliary valves moved.

Figure 1:
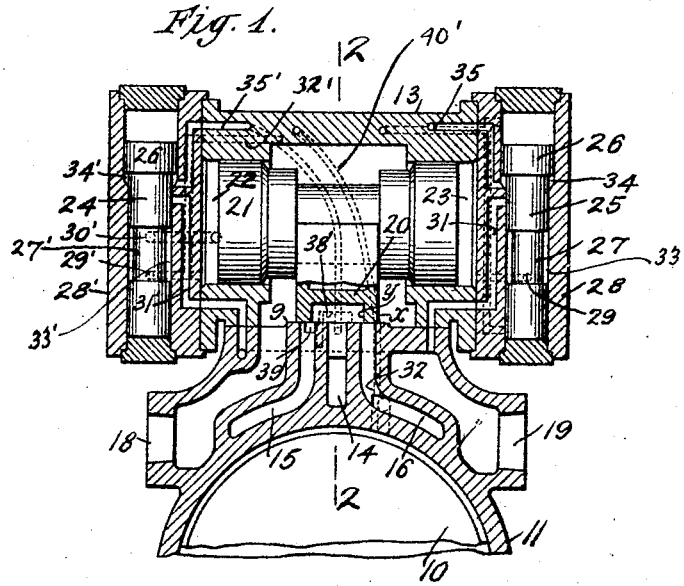
Fig. 1 is a sectional view of the valve gear transverse to the steam cylinder.

Referring to Figs. 1, 2, 3, 6 and 7 of the drawings I will now describe briefly the construction and operation of one form of valve gear of the above type, which is preferably that of my Patent No. 1,390,625 dated September 13, 1921, and then describe in detail the improvements applied thereto and forming my invention.

The main piston 10 is reciprocated within the cylinder 11 by steam directed to one end or the other of the cylinder 11 through ports and passages 15 and 16 which serve alternately as induction and exhaust ports and passages, according to the position of the main slide valve 20 which reciprocates upon a valve seat 9 provided with the usual exhaust port and passage 14. A steam chest 13 encloses the valve seat 9 and receives steam through a supply passage 18 connecting with the interior thereof, and the exhaust port and passage 14 connects with a port 19 for the discharge of the exhaust steam. The main slide valve 20 is reciprocated by a plunger 21, the opposite ends of which reciprocate in cylinders 22 and 23 formed at opposite ends of the steam chest 13.

Equal pressures are normally exerted against the opposite ends of the plunger 21 so that it is maintained in any position to which it is moved. The reciprocation of the plunger 21 is due to the unbalanced pressures at opposite ends thereof caused by alternately shutting off the steam supply to one or the other of the cylinders 22, 23 and simultaneously opening that same cylinder to exhaust.

This operation is accomplished under the control of two auxiliary valves 24 and 25, which reciprocate in auxiliary valve casings 28—281 secured to opposite ends of the steam chest 13. Since these auxiliary valves are identical in construction and operation, it will only be necessary to describe the valve 25. The auxiliary valve 25 is provided at its top with an enlarged head 26 and near its lower end with a reduced portion 27. The auxiliary cylinder 23 is connected to the interior of the auxiliary valve casing 28 by an inlet passage 29 and an exhaust passage 30, and the interior of the casing 28 is connected by a passage 31 with the main exhaust passage 14 and provided with a supply passage 32 connecting with the interior of the steam chest 13. The several ports and passages just described are so located relatively to each other and the reduced portion 27 that when the valve 25 is in its lowermost or normal position steam is admitted to the adjacent cylinder 23 through the passage 32, the annular space 33 around the reduced portion of the valve 25 and passage 29 while communication is obstructed between the exhaust passage 30 and the passage 31. When the valve 25 is raised to operative position the passages 29 and 32 are disconnected, thus shutting off the supply of steam to the cylinder 23 while communication is established between the exhaust passages 30 and 31, thus exhausting the steam from cylinder 23.

Figure 2:
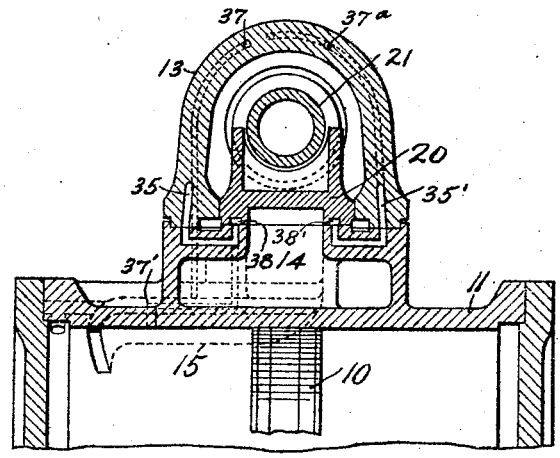
Fig. 2 is a section on the line 2—2 of Fig. 1.
Figure 3:
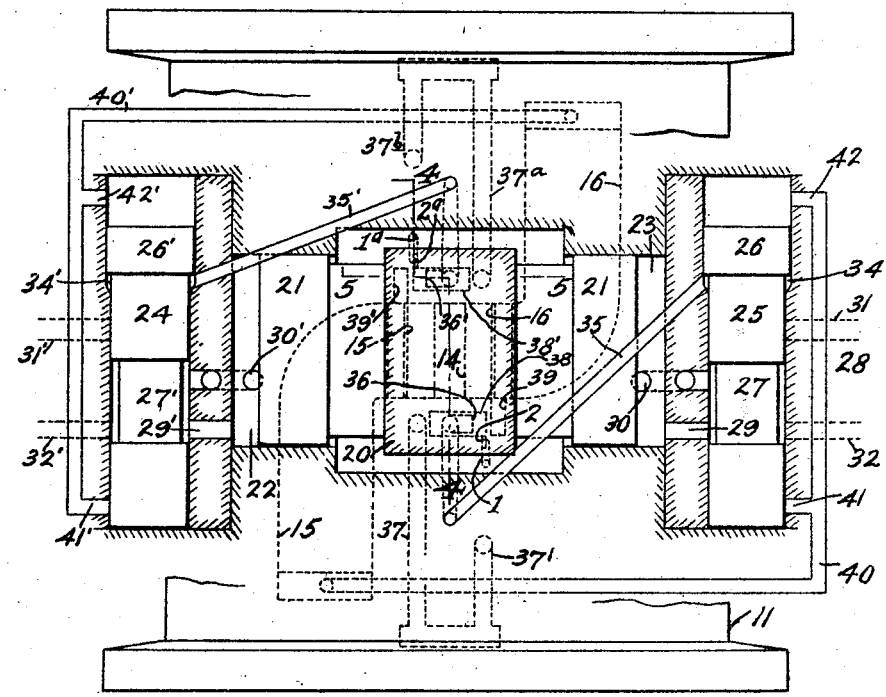
Fig. 3 is a diagrammatic layout of the steam and auxiliary cylinders, valve gear and ports.
Figure 4:
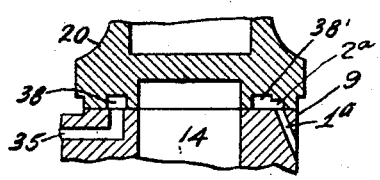
Figs. 4 and 5 are detail sectional views on respectively lines 4—4, 5—5 of Fig. 3.
Figure 5:
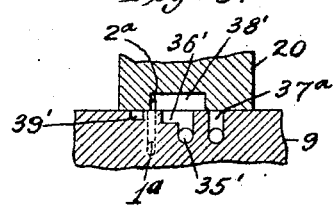

The auxiliary valve 25 is raised into operative position by the admission of steam from the main cylinder 11 to an annular space 34 formed beneath the head 26 of the valve through a passage 35 which terminates in a flaring port 36 in one side of the slide valve seat 9 adjacent to the upper end of a passage 37 which opens at 37' into the main cylinder 11 near the left end thereof, as shown in Figs. 2 and 7. A groove 38 in the under face of the main slide valve 20 connects the valve seat terminals of the passages 35 and 37 when the main valve is in its extreme position toward the left (Fig. 3) so that live steam from the right side of the piston 10 may pass to the space 34 and quickly cause the operative stroke of the auxiliary valve 25 when the main piston in its stroke to the left opens the passage 37 to the live steam driving the main piston 10. The operative stroke of the auxiliary valve 25, as previously stated, shuts off the flow of live steam to the auxiliary cylinder 23 and simultaneously opens said cylinder to exhaust thus unbalancing the pressures in the auxiliary cylinders 22 and 23, whereby the plunger 21 moves to the right carrying with it the main valve 20 for the delivery of steam to the left end of the main cylinder for the reversal of the main piston 10.

Movement of the main valve 20 to the right connects the flaring port 36, valve seat terminal of the passage 35, through groove 38, with a lateral extension 39 of the port and passage 16 which, being now connected to the exhaust passage 14, allows the steam to exhaust from the space 34 beneath the head 26 of the auxiliary valve 25. Simultaneously live steam is passed from port and passage 15 through passage 40 and ports 41 and 42 to the top and the bottom of the auxiliary valve 25 whereby the valve is positively and gently forced down to its normal position by reason of the difference of area between the top and bottom surfaces of the valve.

The auxiliary valve 24 is the same in structure as the auxiliary valve 25 and is connected with the main cylinder and the exhaust passage by means of a series of passages identical in formation and arrangement with the passages connected with the auxiliary valve 25 and are designated by corresponding reference numerals primed, with the sole exception of the passage 37 and its opening 37' which are marked respectively 37$^a$ and 37$^b$. Wherefore, the movement of the main valve to the right connects the space 34' under the head 26' of the valve 24 with the opposite end of the cylinder through passages 35', 37$^a$ and groove 38' on the opposite side of the valve seat 9, so that when the piston 10 in its movement to the right uncovers the opening 37$^b$ of the passage 37$^a$, the auxiliary valve 24 undergoes the same operation as above described in connection with the auxiliary valve 25 to produce an opposite movement of the plunger 21 and the main valve 20 to secure a reversal of the main piston 10.

Referring now to the features added in accordance with the present invention, and by which the automatic throw of the valve, if stopped on dead center, is secured, in the preferred construction shown, I provide the main valve 20 with a steam lap $x$ and a negative exhaust lap $y$ as shown in Fig. 1, so that, when the main valve 20 is in its dead center position, steam will not pass to either of the passages 15 and 16, and these passages will be under the same pressure, that is, exhaust pressure, as they will be connected to each other and the exhaust passage 14 by the negative exhaust lap $y$. Since passages 40, 40' connect respectively with the passages 15, 16, the top and bottom of each of the auxiliary valves 24 and 25 will be under exhaust pressure. In order to assure movement of one or the other of the auxiliary valves 25 and 25 on turning on the steam, I provide the main valve seat 9 with two passages 1 and 1$^a$ connecting with the steam chest 13 and at one end of the groove 38 and at the opposite end of the groove 38' in the main valve 20 a slot, respectively, 2 and 2$^a$ adapted to connect with the passages 1 and 1$^a$ respectively when the main valve 20 is in its dead center position.

The operation of this device is as follows: When the steam is turned on it passes through the passages 1 and 1$^a$, the slots 2 and 2$^a$, grooves 38, 38' and passages 35, 35' to the spaces 34, 34' beneath the heads 26, 26' of the auxiliary valves 25 and 24, whereby, due to the difference of pressures in the ports and passages, and the difference in the force required to start the auxiliary valves 24 and 25 from their normal positions, one valve will move to operative position ahead of the other and in so doing will connect that end of the plunger 21 to the exhaust, thus causing a movement of the main valve 20 from its dead center position and delivering steam to one end of the main cylinder 11, whereby the valve gear will resume its normal operation as set forth previously.

It will be understood that the invention is not to be limited to the particular valve gear shown, nor to the detail construction

What is claimed is:

1. A fluid pressure engine comprising a main cylinder and steam chest, a fluid actuated main valve controlling the distribution of steam to and from the main cylinder, a fluid actuated auxiliary valve controlling the movement of the main valve, and means operating when the main valve is stopped in dead center position to move the auxiliary valve by applying unbalanced pressures thereon whereby the auxiliary valve will be moved when steam is admitted to the steam chest.

2. A fluid pressure engine comprising a main cylinder and steam chest, a fluid actuated main valve controlling the distribution of steam to and from the main cylinder, a fluid actuated auxiliary valve controlling the movement of the main valve, and means controlled by the main valve operating when the main valve is stopped in dead center position to move the auxiliary valve by applying unbalanced pressures thereon.

3. A fluid pressure engine comprising a main cylinder and steam chest, a fluid actuated main valve and its seat, a fluid actuated auxiliary valve controlling the movement of the main valve, a passage connecting the steam chest and the main valve seat, a passage connecting one side of the auxiliary valve with said seat, a groove in the main valve adapted to connect said passages when the main valve is in dead center position, and ports connecting the other side of the auxiliary valve with the exhaust in said position of the main valve.

4. A fluid pressure engine comprising a main cylinder and steam chest, a fluid actuated main valve controlling the distribution of steam to and from the main cylinder, a fluid actuated auxiliary valve controlling the movement of the main valve, said main valve being arranged to provide a steam lap and a negative exhaust lap in the central position of the valve, and ports controlled by the main valve adapted to connect one side of the auxiliary valve with the steam chest and the other side with the exhaust when the main valve is in dead center position.

5. A fluid pressure engine comprising a main cylinder and steam chest, a fluid actuated main valve and its seat, a fluid actuated auxiliary valve controlling the movement of the main valve, said main valve being arranged to provide a steam lap and a negative exhaust lap in the central position of the valve, a passage connecting the steam chest and the main valve seat, a passage connecting one side of the auxiliary valve with said seat, a groove in the main valve adapted to connect said passages when the main valve is in dead center position, and ports connecting the other side of the auxiliary valve with the exhaust in said position of the main valve.

6. A fluid pressure engine comprising a main cylinder and steam chest, a main slide valve and its seat, a normally balanced plunger for moving the main valve, pressure actuated auxiliary valves controlling the movement of said plunger, passages connecting the steam chest with the valve seat, passages connecting one side of each of the auxiliary valves with said seat, grooves in the main valve adapted to connect said passages when the main valve is stopped in dead center position, and ports connecting the outer sides of the auxiliary valves with the exhaust in said position of the main valve.

7. A fluid pressure engine comprising a main valve plunger, two separate auxiliary valves, means controlled by said auxiliary valves for admitting live steam to normally maintain live steam pressure upon opposite ends of the plunger, means controlled by each of the auxiliary valves for momentarily relieving the steam pressure upon one end of the plunger, and ports and passages for applying unbalanced pressures to move one of the auxiliary valves when steam is turned on with the main valve in dead center position.

8. A fluid pressure engine comprising a main cylinder and steam chest, a main slide valve and its seat, a normally balanced plunger for moving the main valve, pressure actuated auxiliary valves controlling the movement of said plunger, means for applying unbalanced pressure tending to move the auxiliary valves when the main valve is in dead centre position comprising passages 35, 35' connecting one side of each of the auxiliary valves with the opposite sides of the main valve seat, passages 1 and 1ª connecting these same opposite sides of the main valve seat with the steam chest, grooves 38, 38' in each of the corresponding opposite edges of the main valve, slots 2 and 2ª extending from the grooves 38, 38' and adapted to register respectively with the passages 1 and 1ª when the main valve is in dead center position, and ports and passages arranged to connect the other side of each of the auxiliary valves with the exhaust in said position of the main valve.

In testimony whereof, I have hereunto set my hand.

JOHN A. LE CAIN.